No. 770,594. PATENTED SEPT. 20, 1904.
P. A. LETENDRE.
RAKE.
APPLICATION FILED MAR. 7, 1904.
NO MODEL.
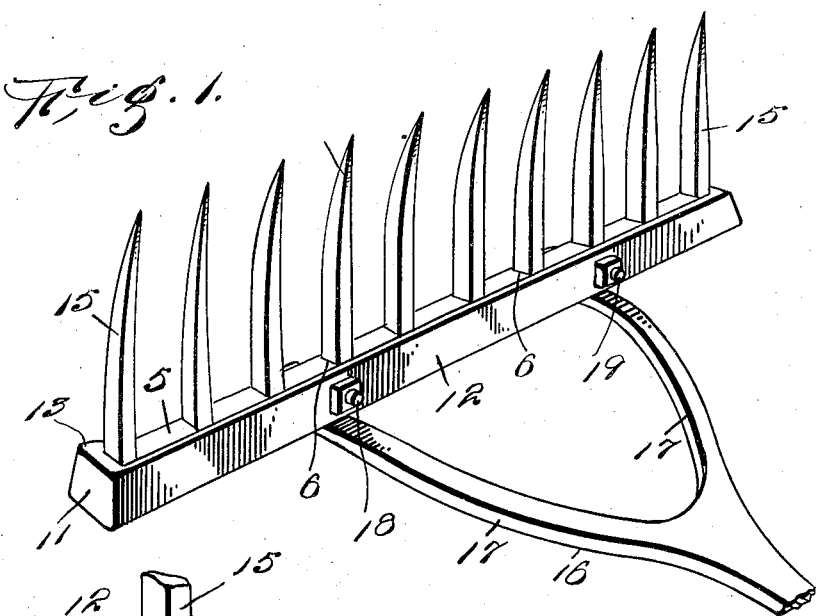
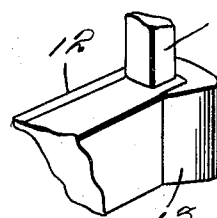
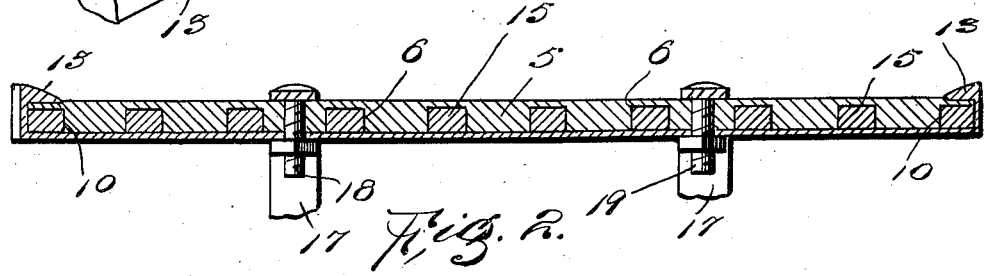
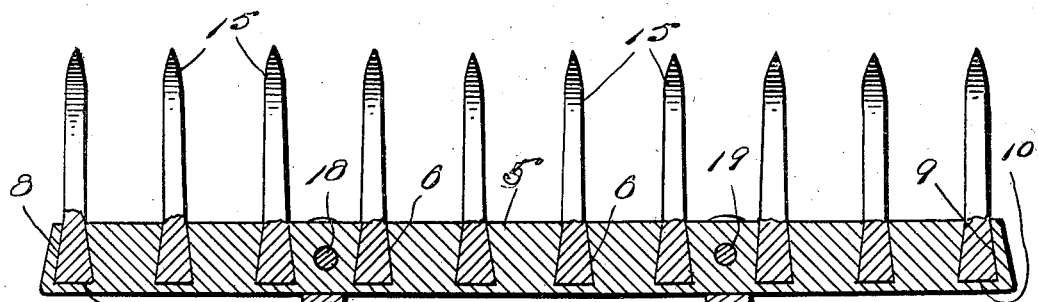
Witnesses
Inventor
P. A. Letendre
By Chandler & Chandler
Attorneys No. 770,594. Patented September 20, 1904.

UNITED STATES PATENT OFFICE.

PETER A. LETENDRE, OF SUNCOOK, NEW HAMPSHIRE.

RAKE.

SPECIFICATION forming part of Letters Patent No. 770,594, dated September 20, 1904.

Application filed March 7, 1904. Serial No. 197,025. (No model.)

*To all whom it may concern:*

Be it known that I, PETER A. LETENDRE, a citizen of the United States, residing at Suncook, in the county of Merrimack, State of New Hampshire, have invented certain new and useful Improvements in Rakes; and I do hereby declare the following to be a full, clear, and exact description of the invention, such as will enable others skilled in the art to which it appertains to make and use the same.

This invention relates to rakes; and it has for its object to provide a construction including a head having teeth which are removably engaged therewith, so that they may be replaced when they become broken.

A further object of the invention is to provide a construction wherein the teeth will be held securely in the head and which, furthermore, will permit of arranging the teeth throughout the length of the head.

An additional object of the invention is to provide a construction wherein the retaining-plate for the teeth as, well as the handle-securing fork, will be held to the head proper by means of the same screws or bolts.

In the drawings forming a portion of this specification, and in which like numerals of reference indicate similar parts in the several views, Figure 1 is a perspective view showing the rake in inverted position. Fig. 2 is a section taken longitudinally through the head of the rake at right angles to the teeth. Fig. 3 is a longitudinal section at right angles to Fig. 2 with the teeth in plan. Fig. 4 is a detail perspective view of an end portion of the rake.

Referring now to the drawings, the rake comprises a head including a tooth-receiving member 5, having in its rear face a series of dovetail recesses 6, which are tapered in the direction of the lower edge of the member through which the recesses open, the major or upper ends of the recesses terminating short of the top of the member 5. The ends of the member 5 are beveled, as shown at 8 and 9, and in the rear faces of the extreme end portions are formed recesses 10, the general dimensions of which are the same as those of the recesses 6, excepting that they do not have fixed outer side walls. The outer side walls of the recesses 10 are formed by the rearwardly-directed end portions 11 of a clamping-plate 12, the portions 11 at their extreme ends being bent toward each other, as shown at 13, so that the clamping-plate may be slipped upwardly onto the member 5 and the latter will wedge between the downwardly-convergent portions 11, the portions 12 serving to hold the clamping-plate against movement of its ends rearwardly from the member 5.

In connection with the head above described there is employed a series of teeth 15, the upper end portions of which are expanded gradually to correspond to the recesses 6 and 10, respectively, in which they are fitted, and in this they are held by the clamping-plate.

A handle-securing fork 16 is provided, the arms 17 of which are bent downwardly at their extremities and disposed against the head, bolts 18 and 19 being passed through the clamping-plate, the member 5, and the downwardly-turned ends of the arms to hold the parts securely together.

It will be noted that with this construction the teeth extend from end to end of the head, while the clamping-plate is held in active position by the use of a minimum number of bolts, it being understood that in practice modifications of the specific construction shown may be made, and any suitable materials and proportions may be used for the various parts without departing from the spirit of the invention.

What is claimed is—

1. A rake comprising a head including a member having recesses therein, certain of said recesses opening through the ends of said member, teeth engaged in said recesses, a clamping-plate disposed against said teeth and having portions disposed to form walls for the endmost recesses, means for holding the clamping-plate in active position, and means for attachment of a handle to the head.

2. A rake comprising a head including a member having downwardly-tapered recesses opening through the bottom of said member, the endmost recesses opening through the ends of the member, the end edges of said member converging downwardly, a clamping-plate disposed against said member and having its end portions bent rearwardly against the convergent end edges of the first member and their extremities bent toward each other to lie behind the first member, teeth having their upper ends fitted in the recesses, handle-attaching means, and means for holding the clamping-plate and the handle-attaching means to the first-named member.

In testimony whereof I affix my signature in presence of two witnesses.

PETER A. LETENDRE.

Witnesses:
FERDINCE MARTEL,
EUGENE A. LEFEBOE.